US006128466A

United States Patent [19]

Terk et al.

[11] Patent Number: 6,128,466

[45] Date of Patent: *Oct. 3, 2000

[54] WIRELESS RECEIVING SUBSYSTEM

[75] Inventors: Neil Terk, Laurel Hollow; George Skahill, Greenlawn, both of N.Y.

[73] Assignees: Terk Technologies Corp., Commack; NTL Technologies, Inc., Greenlawn, both of N.Y.

[ * ] Notice: This patent is subject to a terminal disclaimer.

[21] Appl. No.: 09/272,888

[22] Filed: Mar. 19, 1999

Related U.S. Application Data

[63] Continuation of application No. 08/823,697, Mar. 25, 1997, Pat. No. 5,896,183.

[51] Int. Cl.[7] .................... H04N 7/16

[52] U.S. Cl. .................... 455/3.3; 348/706; 348/6; 455/287

[58] Field of Search .................... 348/706, 725, 348/6, 10, 734, 727, 728; 455/3.3, 3.2, 131, 272, 275, 277.1, 282, 287, 291, 144, 249.1, 180.1, 180.2, 188.1, 188.2, 191.3, 250.1, 6.2, 6.3, 3.1; 343/876, 701, 729, 751, 893, DIG. 2, 803; H04N 5/44; H01Q 3/24

[56] References Cited

U.S. PATENT DOCUMENTS

| | | | |
|---|---|---|---|
| 2,533,529 | 12/1950 | Spindler . | |
| 2,850,734 | 9/1958 | Person, Jr. . | |
| 3,868,689 | 2/1975 | Liu et al. . | |
| 4,063,175 | 12/1977 | Friedman . | |
| 4,112,377 | 9/1978 | Tanner et al. | 325/461 |
| 4,180,804 | 12/1979 | Watanabe et al. . | |
| 4,205,269 | 5/1980 | Watanabe . | |
| 5,230,096 | 7/1993 | Davies et al. . | |
| 5,345,591 | 9/1994 | Tsurumaki et al. . | |
| 5,678,214 | 10/1997 | Azuma . | |
| 5,678,217 | 10/1997 | Usui et al. | 455/277.1 |
| 5,797,090 | 8/1998 | Nakamura . | |
| 5,896,183 | 4/1999 | Terk et al. | 348/706 |

FOREIGN PATENT DOCUMENTS

| | | |
|---|---|---|
| 692692 | 6/1953 | United Kingdom . |

*Primary Examiner*—Chris Grant
*Attorney, Agent, or Firm*—Hoffmann & Baron, LLP

[57] ABSTRACT

A wireless receiving subsystem operatively connectable to a broadcast receiver unit having a frequency tuner has an antenna with a feed point, an amplifier located essentially at the feed point, and a transmission line extending from the feed point of the antenna and the amplifier to a signal input of the broadcast receiver unit. The transmission line having a pair of conductors, for example, coaxial conductors. A manually operated switch is disposed in the transmission line for applying a DC voltage across the conductors, while a relay switch is operatively connected to the transmission line for changing a connection state of the amplifier to the transmission line in response to the voltage.

11 Claims, 2 Drawing Sheets

WIRELESS RECEIVING SUBSYSTEM

This is a continuation of application Ser. No. 08/823,697 filed Mar. 25, 1997 now U.S. Pat. No. 5,896,183.

BACKGROUND OF THE INVENTION

This invention relates to a wireless receiving subsystem. More particularly, this invention pertains to a wireless receiving subsystem with an antenna connected to a signal input of a broadcast receiver such as a television or a radio.

An ordinary radio or television receiving subsystem consists of an antenna, a transmission line connecting the antenna to the radio or television set and the first stage of the set's receiver, often referred to as the front end. The antenna will usually be designed with an instantaneous bandwidth equal to the tunable bandwidth of the receiver.

The antenna receives electromagnetic energy in its operating band and sends it to the set via a transmission line. The received energy consists of a blend of the desired signals transmitted by the broadcast stations and a lot of other undesirable ingredients variously called noise or interference depending on the source and spectral composition of each contributor. In a television picture, what is called interference will usually result in some sort of undesirable pattern of dots or lines or squiggly lines moving about the screen or some segment of it. Interference is generated by equipment of some sort; examples are engine ignitions, radio or television broadcasts other than the one we want, elevators, diathermy, machine shops, motors, etc. Antennas can be endowed with one or more deep nulls, narrow angular regions of very low sensitivity, which can be directed at strong sources of interference. A special case and the most familiar example of interference is that caused by the desired signal arriving at the antenna by two or more paths of different length, resulting in "ghosting." Noise results in "snow," a random distribution of fuzziness or fuzzy dots throughout the picture. Noise comes from all directions at all frequencies and, for most purposes, the noise power received by a consumer antenna cannot be diminished by any means. Some kinds of interference are difficult to distinguish from pure noise and their effects are usefully considered together with the effects of noise.

The measure of adequacy of desired signal reception with respect to noise power is called the signal-to-noise ratio ("SNR"). For a particular signal bandwidth, this measure is just what it says, the total desired signal power divided by the total noise power. The problematic part of the noise issue is that the ratio of signal to noise at the antenna terminals is degraded—usually by a slight amount—in its passage down the transmission line and the ratio of signal to noise delivered to the radio/television set's terminals is degraded by the first stage of the receiver. For many applications, the receiver is the dominant source of noise power. Much effort has been directed at achieving "low noise receivers" and "low noise amplifiers" to improve reception quality.

Modern receiving sets feature very good first stage amplifiers which amplify incoming signals (including received signal power+received noise power+transmission line noise power) delivered by the transmission line while adding some amplifier noise power. Subsequent stages of amplification also add noise power, but the parameters of the first stage of amplification almost always dominate these considerations. Many advances in picture quality in recent decades are the result of improvements in the front end amplifier designs.

In the consumer marketplace, there has been a trend toward providing an amplifier located at the antenna, often integrated into the antenna enclosure. At first glance, this appears to be a reasonable thing to do. The signal at the antenna is amplified so the cable losses and the noise power contributions of the cable are relatively less important.

However, there are several features that may be overlooked in this simplistic assessment: every operation adds noise power and the addition of an antenna amplifier results in degraded SNR at the amplifier output compared with that at the antenna terminals; the antenna amplifier is unlikely to offer noise performance as good as a modern radio or television set's first stage amplifier; an antenna amplifier for television will often have a pass band of about 50 to 850 MHZ and it is quite possible for the totality of signals received and amplified in that band to be powerful enough to saturate (overdrive) some part of the receiving chain, with attendant sound or picture distortions. This last factor can result in, for example, an overflying aircraft transmitting at 125 MHZ distorting the quality of signals received from any television or FM broadcast. Similarly, a broadcast station located very close to a receiving site could produce distortions at every broadcast station frequency. Without the additional (antenna) amplifier, signal levels are reduced and saturation is less likely.

On the other hand, when a long cable run connects the antenna with the radio or television set, an amplifier at the antenna may enhance the SNR delivered to it. For a hundred foot length of RG-6 coaxial cable, for example, attenuation in the UHF television band exceeds 7½ dB and an amplifier at the antenna end of the cable will probably be useful. At the low VHF television band and at the FM radio band, the same cable results in attenuations ranging from 1½ to 3 dB and an antenna amplifier will more likely increase the system SNR than diminish it. At the high VHF television band, attenuations of 4 to 4½ dB are obtained and SNR might improve ever so slightly (try it and see is the best thing to do).

Also, where the broadcast receiver is a very old radio or television set and the antenna amplifier is state of the art, results will be better with the amplifier than without it.

An outdoor TV antenna product exists with an integrated amplifier. DC power is provided to the antenna amplifier through the coaxial cable which connects to the TV set through a small "power injector" unit which plugs into a wall outlet and has imperceptible attenuation of RF signals. This product exhibits the disadvantages discussed above. With 100 feet of cable, the amplifier helps at the higher part of the UHF band and makes little difference otherwise. With 6 feet of cable, the amplifier hurts a few channels and does not affect the others noticeably. An especially significant disadvantage of this existing product is the large signal attenuation obtained when the power injector is unplugged. This results in excellent pictures literally disappearing when power is removed.

OBJECTS OF THE INVENTION

An object of the present invention is to provide an improved wireless receiving subsystem for use with or connection to broadcast receivers.

Another object of the present invention is to provide such a wireless receiving subsystem which incorporates an antenna amplifier but enables the elimination of disadvantages arising from the use of an antenna amplifier.

A further object of the present invention is to provide such a wireless receiving subsystem which includes a television antenna, different from the conventional rabbit-ear design, which has satisfactory reception characteristics even without adjustment.

A related object of the present invention is to provide a method for operating a wireless receiving subsystem having an antenna amplifier.

These and other objects of the present invention will be apparent from the drawings and detailed descriptions provided below.

SUMMARY OF THE INVENTION

A wireless receiving subsystem operatively connectable to a broadcast receiver unit having a frequency tuner comprises, in accordance with the present invention, an antenna having a feed point, an amplifier located essentially at the feed point, and a transmission line extending from the feed point of the antenna and the amplifier to a signal input of the broadcast receiver unit, the transmission line having a pair of conductors. A first switch is disposed in the transmission line for applying a DC voltage across the conductors, while a second switch is operatively connected to the transmission line for changing a connection state of the amplifier to the transmission line in response to the voltage.

The second switch is preferably a double-throw switch arranged to alternately connect the feed point to the signal input (a) directly, bypassing the amplifier, and (b) indirectly via the amplifier. In a specific embodiment of the invention, the second switch is arranged so as to connect the amplifier to the feed point, on the one side, and the signal input, on the other side, upon the applying of the voltage across the conductors by the first switch.

The first switch is generally located essentially at the broadcast receiver unit, so that the user or operator can manually actuate the first switch in accordance with signal reception preferences.

Where the transmission line is a coaxial cable, the conductors comprise inner and outer conductors of the cable. The second switch may specifically take the form of an electromagnetic relay.

The relay may be located between the amplifier and the feed point, or between the amplifier and the first switch. Alternatively, there may be two relays located on opposite sides of the amplifier. The relays act in concert to change a connection state of the amplifier to the transmission line in response to the voltage applied by the first switch across the two conductors.

Where the broadcast receiver unit is a television, the antenna may take an elongate form with a pair of opposite end segments folded back to overlap a central segment.

A signal receiving subsystem in accordance with the invention provides the benefits of an antenna amplifier while omitting the disadvantages. A switch located at the television or radio receiver controls the insertion of the amplifier into the line from the antenna.

DESCRIPTION OF THE PREFERRED EMBODIMENTS

Figure 1:
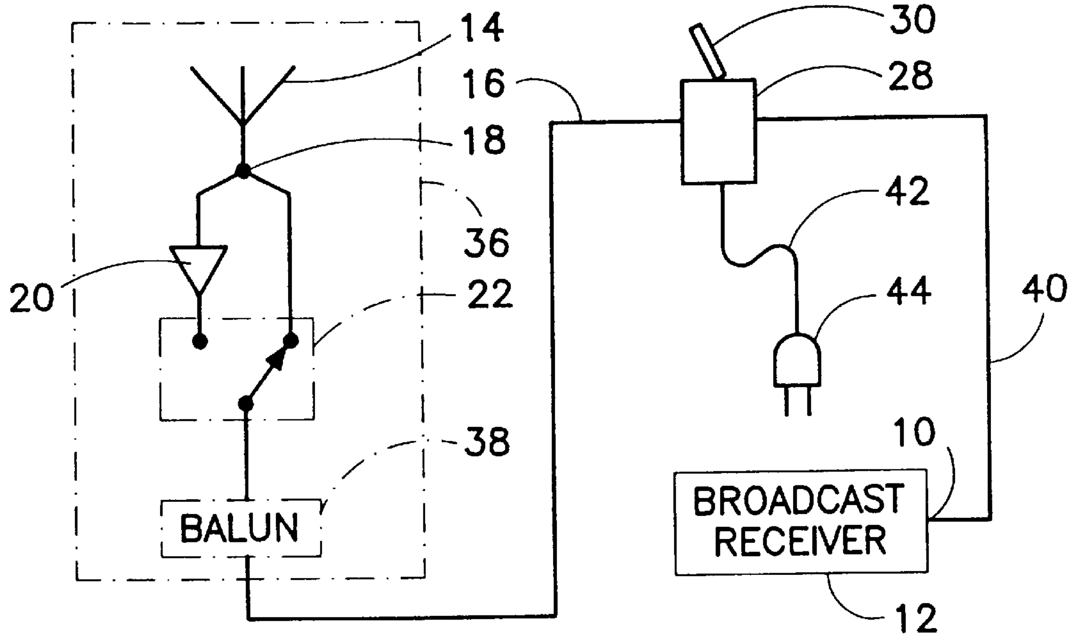
FIG. 1 is partially a circuit diagram and partially a block diagram of a wireless signal receiving subsystem in accordance with the present invention.
Figure 2:
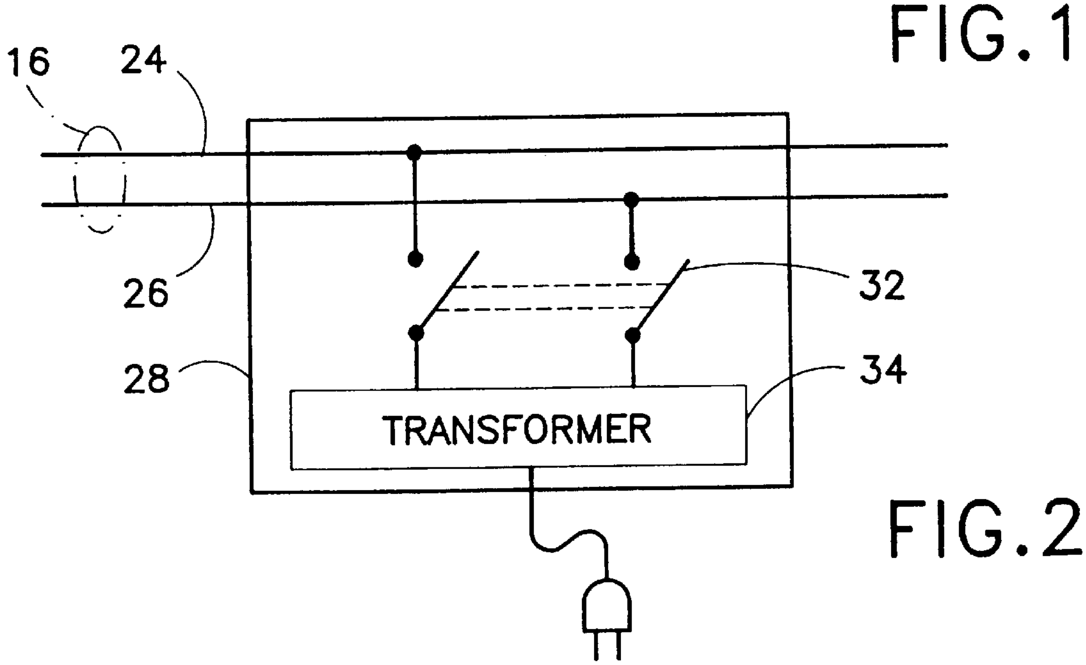
FIG. 2 is partially a circuit diagram and partially a block diagram of a power switch included in the wireless signal receiving subsystem of FIG. 1.

As illustrated in FIG. 1, a signal input 10 of a broadcast receiver such as a television or radio 12 having a conventional tuning circuit (not shown) is operatively connected to an antenna 14 via a coaxial transmission line 16. At an end opposite signal input 10, transmission line 16 is connected to a feed point 18 of antenna 14 either directly or via an amplifier 20, depending on the operational state of a double-throw relay switch 22. The position of switch 22 in turn depends on the DC potential difference between an inner conductor 24 (FIG. 2) and an outer conductor 26 of coaxial transmission. When inner conductor 24 and outer conductor 26 have essentially the same DC potential, relay switch 22 has the operational state represented in FIG. 1, wherein coaxial line 16 is connected directly to antenna feed point 18. When a predetermined voltage difference exists between inner conductor 24 and outer conductor 26, relay switch 22 changes its operational state so that coaxial line 16 is connected to antenna feed point 18 via amplifier 20.

The change in operational state of relay switch 22 is controlled by the user via a power switch 28 inserted in coaxial line 16. An actuator 30 of switch 28 is manipulated by the user to close one or more switch elements 32 (FIG. 2) to connect conductors 24 and 26 to a secondary coil (not shown) of an AC-to-DC transformer or power supply 34. This action produces a predetermined voltage or potential difference, e.g., 18 volts, between inner conductor 24 and outer conductor 26.

Amplifier 20 and relay switch 22 are provided in an antenna housing 36 which also encloses the antenna itself. Often a balun transformer 38 is also provided in housing 36 and is electrically connected between coaxial line 16, on the one side, and amplifier 20 and feed point 18, on the other side. The balun transformer 38 is likewise disposed in housing 36. Transformer 38 is a 75 Ω to 300 Ω transformer preferably comprising a ferrite torus and windings of thin wire and occupies a volume of substantially less than one cubic inch.

It is to be noted that, in an alternative configuration (not illustrated) of the wireless receiving subsystem, housing 36 may enclose just amplifier 20, relay switch 22, and transformer 38. In that case, the antenna 14 is disposed outside of housing 36. It is to be noted further that balun 38 may be connected between feed point 18, on the one side, and amplifier 20, on the other side.

Antenna 14 and housing 36 will often be located remotely from broadcast receiver 12 and perhaps on a roof or in an attic. In practice, power switch or injector unit 28 is provided with a short length of cable 40 for connecting the power switch to signal input 10 of broadcast receiver. Cable length 40 is a part of coaxial transmission line 16. Power switch 28 is also provided with a cord 42 and a plug 44 for accessing ordinary house current.

Figure 3:
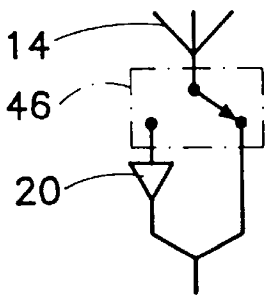
FIG. 3 is a circuit diagram showing a modification of the wireless signal receiving subsystem of FIG. 1.
Figure 4:
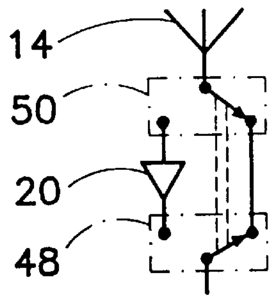
FIG. 4 is a circuit diagram showing another modification of the wireless signal receiving subsystem of FIG. 1.
Figure 5:
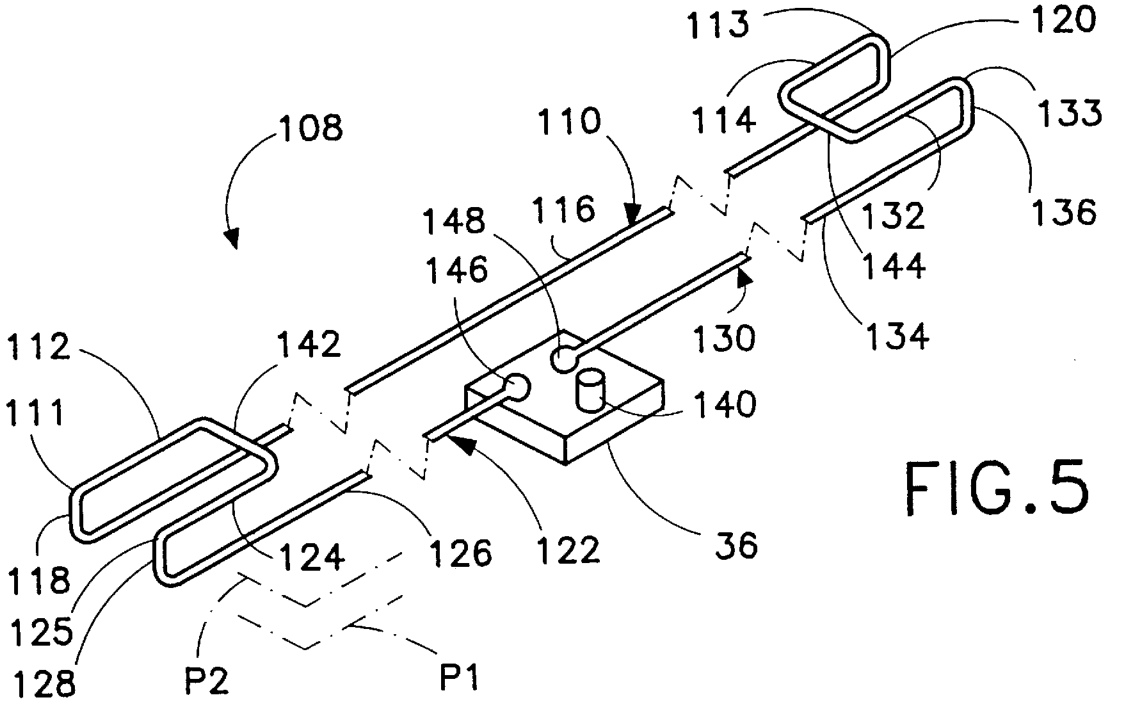
FIG. 5 is a schematic perspective view, on a reduced scale, of a folded dipole antenna utilizable in the wireless signal receiving subsystem(s) of FIGS. 1–4, also showing a housing illustrated in FIG. 1.
Figure 6:
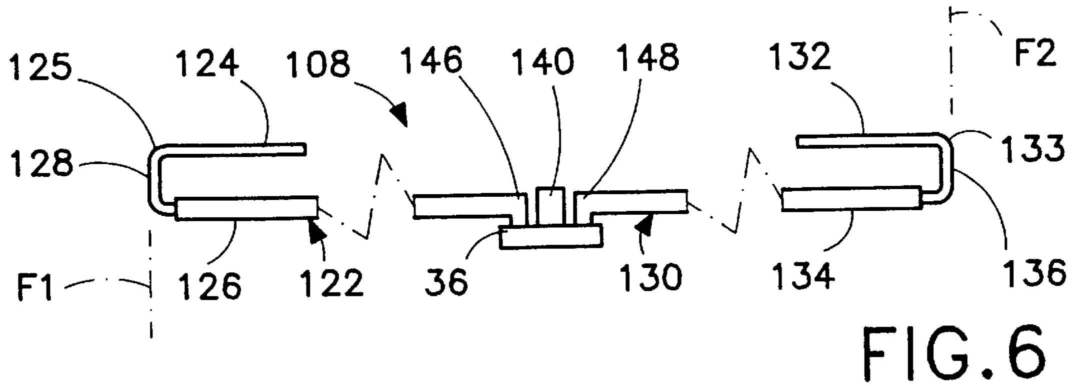
FIG. 6 is a schematic side elevational view, on a similarly reduced scale, of the folded dipole antenna of FIG. 5.
Figure 7:
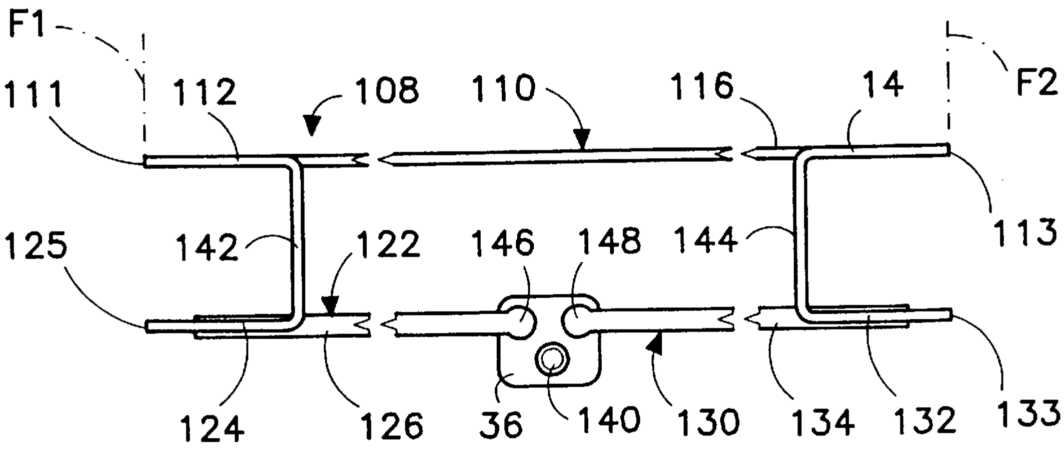
FIG. 7 is a schematic top plan view, on a similarly reduced scale, of the folded dipole antenna of FIGS. 5 and 6.

FIGS. 3 and 4 utilize the same reference numerals as FIG. 1 for the same circuit elements. As depicted in FIG. 3, a double-throw relay switch 46 performing the function of switch 22 is located between antenna feed point 18 and amplifier 20, rather than on the cable connection side of the amplifier. In the alternative configuration of FIG. 4, two ganged double-throw relay switches 48 and 50 are provided on opposite sides of amplifier 20. Each relay switch 22, 46, 48, 50 has a solenoid coil (not shown) operatively connected across conductors 24 and 26 for operating the respective switch in response to the application of an 18 volt potential difference to the conductors.

Where broadcast receiver 12 is a television set, antenna 14 may take the form of a folded back dipole antenna 108 illustrated in FIGS. 5–7. Antenna 108 includes a first linear conductor 110 having a total length of approximately 85.5 inches. Conductor 110 has linear end segments 112 and 114 folded back at bends 111 and 113 over a linear central segment 116. Each end segment 112 and 114 is approximately 5.5 inches long and extends parallel to central segment 116. End segments 112 and 114 are connected to central segment 116 by respective connector segments 118 and 120 each approximately 0.75 inch long. Central segment 116 is approximately seventy-three inches in length.

The antenna further comprises a second linear conductor 122. Conductor 122 has a 5.5-inch linear end portion 124 of a 0.05-inch diameter folded back at a bend 125 over a 36.5-inch linear major portion 126 of 0.125-inch diameter. End portion 124 extends parallel to major portion 126 and is spaced approximately 0.75 inch therefrom by a linear connector piece 128 having a diameter of 0.05 inch.

A third linear conductor 130 is a mirror image of conductor 122. Accordingly, conductor 130 is provided with a 5.5-inch linear end portion 132 of a 0.05-inch diameter folded back at a bend 133 over a 36.5-inch linear major portion 134 of a 0.125-inch diameter. End portion 132 is parallel to major portion 134 and is spaced approximately 0.75 inch therefrom by a linear connector piece 136 having a diameter of about 0.05 inch.

The difference in the diameters of end portions 124 and 132, on the one hand, and major portion 126 and 134, on the other hand, serves to adjust impedance level. The limitation of the thicker diameter of 0.125 inch to major portions 126 and 134 facilitates manufacture of the dipole antenna.

Conductors 122 and 130 are colinear and extend substantially parallel to conductor 110. At their juxtaposed inner ends, conductors 122 and 130 are connectable to respective members of a balanced two-wire feed line (not shown). Preferably, however, conductors 122 and 130 are connected at their inner ends or terminals 146 and 148 to balun transformer 38 (FIG. 1) directly or via amplifier 20, depending on the operational state of relay switch 22. As shown in FIG. 5, housing 36 is provided with a coaxial connector 140 for receiving a coaxial line (not shown) extending to television receiver 12 (FIG. 1).

Conductors 110, 122 and 130 may be provided with dielectric sheathing (not shown) for assisting in the support of the two dipole arms, which extend on opposite sides of the feed point and transformer 38. The dielectric materials must exhibit low loss, radio frequency properties at commercial television frequencies. Radio frequency conductivity across any metal-to-metal junctions must be excellent.

End segments 112 and 114 of conductor 110 are connected to respective end portions 124 and 132 of conductors 122 and 130 via generally linear connecting conductors 142 and 144 each approximately 1.5 inches long.

Conductors 110, 122 and 130 lie in a first plane P1 while end segments 112 and 114 and end portions 124 and 132 define a second plane P2 oriented parallel to plane P1. Connector segment 118 and linear connector piece 128 define a first fold plane F1, while connector segment 120 and linear connector piece 136 define another fold plane F2 parallel to the first. These fold planes F1 and F2 are substantially perpendicular to planes P1 and P2.

All of the conductors of the antenna device are rods or tubes made of copper or aluminum. Conductor 110 preferably has a diameter of approximately 0.050 inch, while conductor 122, and more particularly major portion 126 thereof, has a diameter of 0.125 inch. Connecting conductors 142 and 144 are approximately 0.050 inch in diameter. It is to be noted that the conductor lengths set forth herein include arcuate ends of the various linear segments (see FIG. 6) and are perhaps more accurately characterized as distances between ends of the respective linear conductors. For example, the length of 0.75 inch of connector pieces 118, 120, 128 and 136 is perhaps more accurately characterized as the distance between end segments 112 and 114 and central segment 116 or, concomitantly, as the distance between end portions 124 and 132 and the respective major portions 126 and 134 of conductors 122 and 130.

It is to be noted that terminals 146 and 148 of major conductor portions 126, instead of being connected to balun transformer 138, may be connected to respective wires of a balanced two-wire pair (not shown). In that case, a balun transformer (not shown) may be connected to the two wires at ends thereof opposite the dipole antenna.

A folded back dipole antenna as disclosed herein with reference to FIGS. 5–7 provides wide-angle coverage for television broadcast channels 2–13 and is an efficient receiver of wireless television signals at all channels (2–69).

Although the invention has been described in terms of particular embodiments and applications, one of ordinary skill in the art, in light of this teaching, can generate additional embodiments and modifications without departing from the spirit of or exceeding the scope of the claimed invention. For example, it should be clear that amplifier 20 may be bypassed by simply pulling plug 44 from its electrical socket. Concomitantly, it is possible to omit switch elements 32 from power switch or injector unit 28 and have transformer or power supply 34 permanently connected inside power switch 28 to coaxial conductors 24 and 26. The amplifier is then switched into the wireless receiving subsystem by inserting plug 44 into an electrical socket.

Accordingly, it is to be understood that the drawings and descriptions herein are proffered by way of example to facilitate comprehension of the invention and should not be construed to limit the scope thereof.

What is claimed is:

1. A wireless receiving subsystem operatively connectable to a broadcast receiver unit having a frequency tuner, comprising:

an antenna having a feed point;

an amplifier located essentially at said feed point;

a transmission line extending from said feed point of said antenna and said amplifier to a signal input of a broadcast receiver unit, said transmission line having a pair of conductors;

a first switch disposed in said transmission line for applying a DC voltage across said conductors; and a second double-throw switch arranged so as to connect said amplifier to said feed point and said signal input upon the applying of said voltage across said conductors by said first switch so that in one mode of operation said feed point is connected indirectly to said transmission line via said amplifier and in another mode of operation said feed point is directly connected to said transmission line, thereby bypassing said amplifier.

2. The wireless receiving subsystem defined in claim 1 wherein said first switch is located essentially at said broadcast receiver unit.

3. The wireless receiving subsystem defined in claim 1 wherein said transmission line is a coaxial cable, said conductors comprising inner and outer conductors of said cable.

4. The wireless receiving subsystem defined in claim 1 wherein said second switch includes an electromagnetic relay.

5. The wireless receiving subsystem defined in claim 1 wherein said second switch is located between said amplifier and said feed point.

6. The wireless receiving subsystem defined in claim 1 wherein said second switch is located on a side of said amplifier opposite said feed point.

7. The wireless receiving subsystem defined in claim 1 wherein said second switch is one of a pair of second switches operatively connected to said transmission line on opposite sides of said amplifier, and said second switches acting in concert to change a connection state of said amplifier to said transmission line.

8. The wireless receiving subsystem defined in claim 1 wherein said broadcast receiver unit is taken from the group including a television and a radio.

9. A wireless receiving subsystem defined in claim 1, wherein said antenna includes a pair of opposite end segments folded back to overlap a central segment.

10. A method utilizable with a wireless receiving subsystem including an antenna having a feed point, an amplifier located essentially at said feed point, a transmission line extending from said feed point of said antenna and said amplifier to a signal input of a broadcast receiver unit having a frequency tuner, said method comprising:

operating a switch to connect said feed point to said signal input via said amplifier and said transmission line;

operating an actuator operatively connected to said switch, the operating of said actuator placing a DC voltage on said transmission line; and in response to the the placement of said voltage on said transmission line, automatically operating said switch to connect said feed point directly to said signal input via said transmission line to bypass said amplifier, thereby eliminating possible signal degradation owing to circuit elements of said amplifier.

11. The method defined in claim 10 wherein said actuator applies said voltage to said transmission line at a point located essentially at said broadcast receiver unit.

* * * * *